United States Patent [19]

Midden et al.

[11] Patent Number: 6,058,721

[45] Date of Patent: May 9, 2000

[54] COLD DRINK SYSTEM

[75] Inventors: William E. Midden; John T. Knepler, both of Springfield, Ill.

[73] Assignee: Bunn-O-Matic Corporation, Springfield, Ill.

[21] Appl. No.: 09/058,449

[22] Filed: Apr. 10, 1998

Related U.S. Application Data

[60] Provisional application No. 60/044,704, Apr. 18, 1997.

[51] Int. Cl.[7] .................................................. A23G 9/12
[52] U.S. Cl. ............................................. 62/136; 62/342
[58] Field of Search .............................. 62/136, 342, 343

[56] References Cited

U.S. PATENT DOCUMENTS

| | | |
|---|---|---|
| Re. 25,859 | 9/1965 | Thomas . |
| D. 260,095 | 8/1981 | Bischoff et al. . |
| 2,536,319 | 1/1951 | Slack ........................................... 62/136 |
| 2,541,814 | 2/1951 | Caddini ....................................... 62/136 |
| 2,559,032 | 7/1951 | Tacchella .................................... 62/136 |
| 3,245,664 | 4/1966 | Gatheridge . |
| 3,255,938 | 6/1966 | Dimmich et al. . |
| 3,298,190 | 1/1967 | Harker ........................................ 62/136 |
| 3,359,748 | 12/1967 | Booth ......................................... 62/136 |
| 3,407,618 | 10/1968 | Mullins, Jr. ................................ 62/136 |
| 3,635,727 | 1/1972 | Ehrgott . |
| 3,765,569 | 10/1973 | Rimini . |
| 3,865,277 | 2/1975 | Rimini . |
| 4,390,760 | 6/1983 | Schwitters . |
| 4,393,659 | 7/1983 | Keyes et al. . |
| 4,401,449 | 8/1983 | Martin et al. . |
| 4,412,428 | 11/1983 | Giannella . |
| 4,625,525 | 12/1986 | Bradbury et al. . |
| 4,696,417 | 9/1987 | Ugolini . |
| 4,736,593 | 4/1988 | Williams .................................... 62/136 |
| 4,900,158 | 2/1990 | Ugolini . |
| 5,005,364 | 4/1991 | Nelson . |
| 5,170,344 | 12/1992 | Berton et al. . |
| 5,207,991 | 5/1993 | Gerking . |
| 5,332,309 | 7/1994 | Ramazzotti et al. . |
| 5,419,150 | 5/1995 | Kaiser et al. . |

FOREIGN PATENT DOCUMENTS

| | | |
|---|---|---|
| 8902462 | 4/1989 | Brazil . |
| MI92A2700 | 11/1992 | Italy . |
| 1493228 | 7/1989 | U.S.S.R. ................................... 62/136 |

*Primary Examiner*—William E. Tapolcai
*Attorney, Agent, or Firm*—Trexler, Bushnell, Giangiorgi & Blackstone, Ltd.

[57] ABSTRACT

An apparatus for producing a chilled or partially frozen beverage often referred to as a slush beverage. A variety of apparatus have been designed to produce chilled beverages as well as to produce beverages which are in a "slush" form. Some of these apparatus are referred to as "granita" machines. Such apparatus can be used to produce slush beverages from a variety of products including fruit juices, coffee-based beverages, tea-based beverages, as well as beverages containing alcohol. Such apparatus includes a chilling structure, and some form of blade or auger which moves relative to the chilling portion to strip the frozen product off and circulate the beverage along the chilling portion. Circulation of the beverage along the chilling portion helps to reduce the temperature of the beverage mixture thereby approaching a slush consistency.

19 Claims, 18 Drawing Sheets

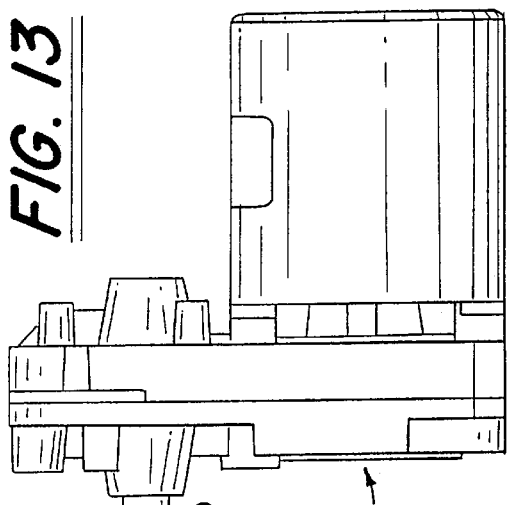
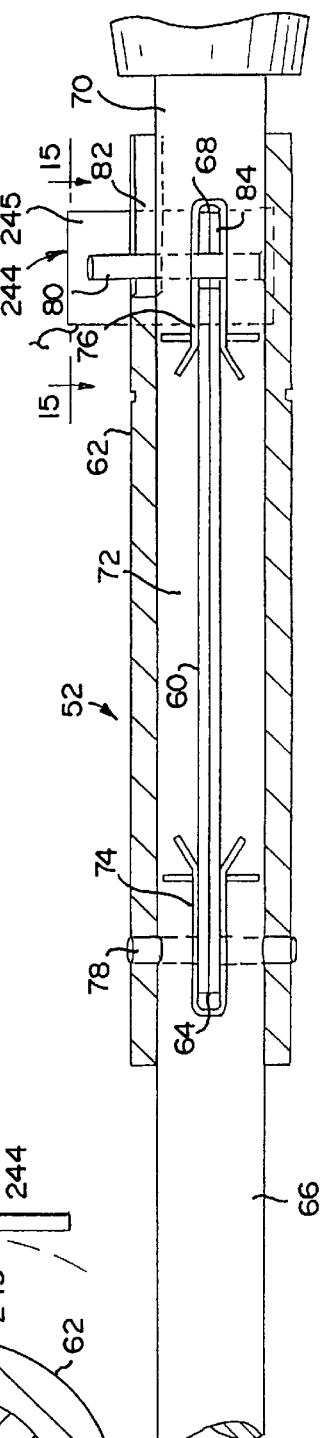
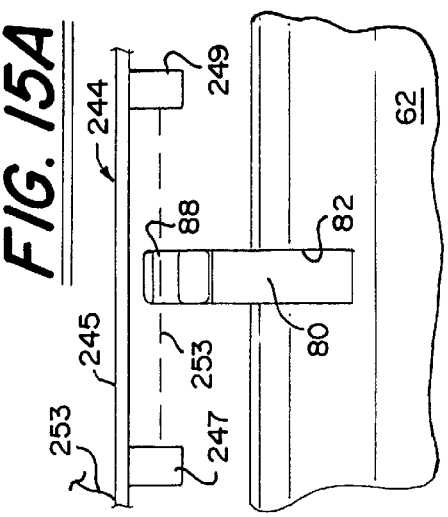
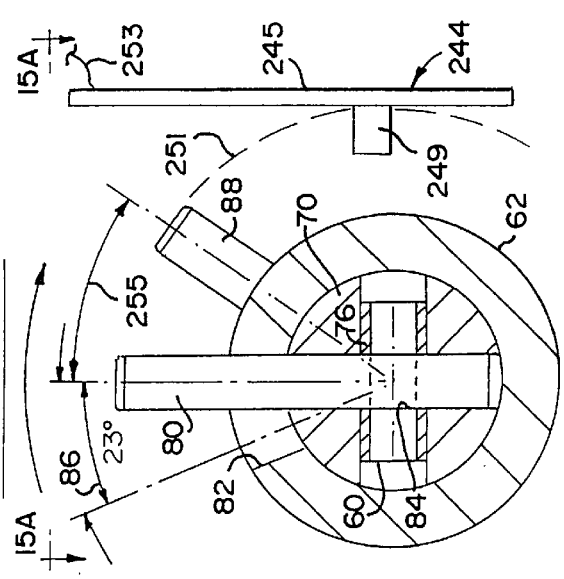

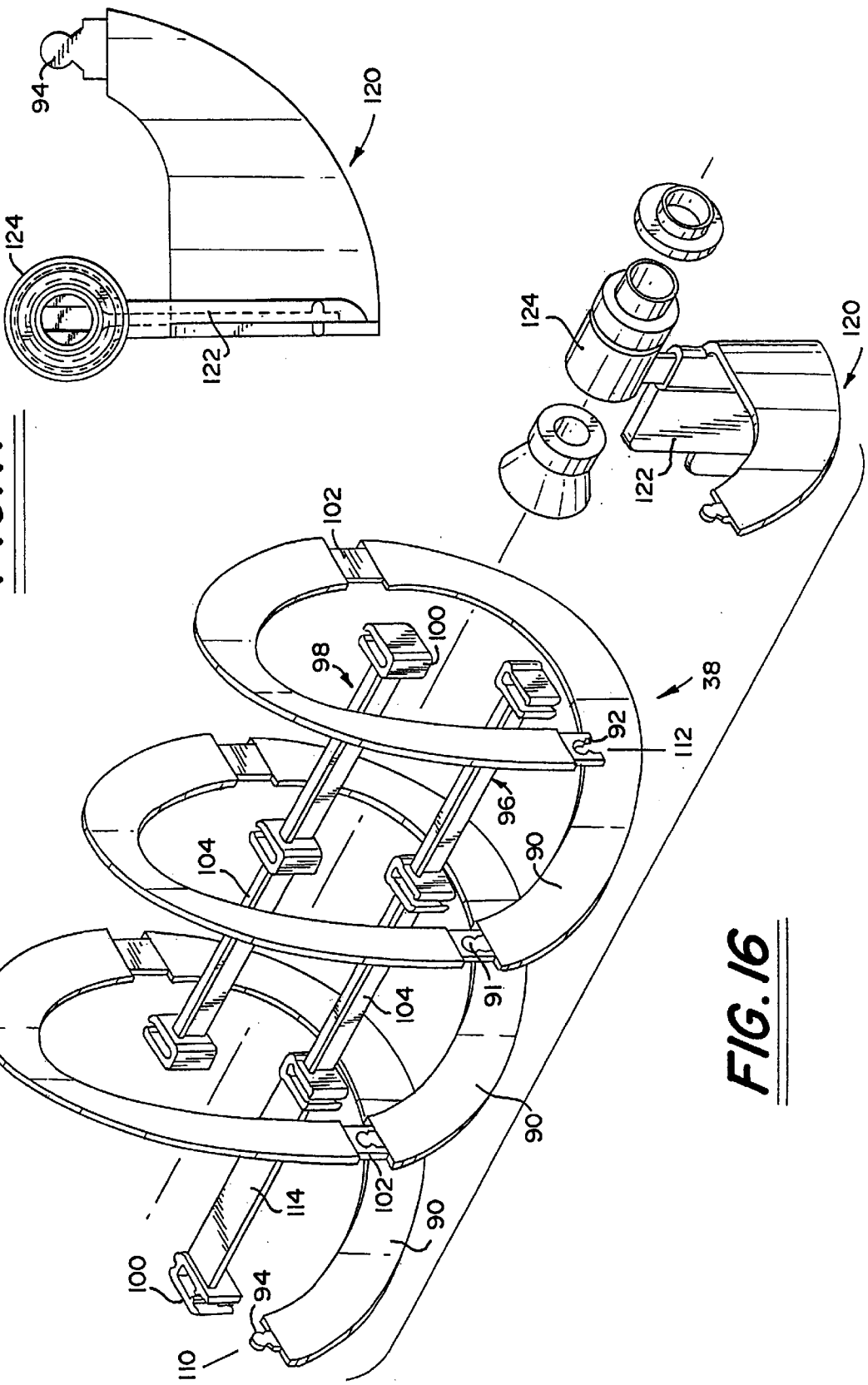

COLD DRINK SYSTEM

CROSS REFERENCE

This patent application claims the benefit of domestic priority of copending U.S. Provisional Application Ser. No. 60/044,704, filed Apr. 18, 1997.

BACKGROUND

The present invention relates to an apparatus for producing a chilled or partially frozen beverage often referred to as a slush beverage.

A variety of apparatus have been designed to produce chilled beverages as well as to produce beverages which are in a "slush" form. Some of these apparatus are referred to as "granita" machines. Such apparatus can be used to produce slush beverages from a variety of products including fruit juices, coffee-based beverages, tea-based beverages, as well as beverages containing alcohol. Such apparatus includes a chilling structure, and some form of blade or auger which moves relative to the chilling portion to strip the frozen product off and circulate the beverage along the chilling portion. Circulation of the beverage along the chilling portion helps to reduce the temperature of the beverage mixture thereby approaching a slush consistency.

A variety of problems have arisen with the prior art such that there is a need for an improved chilled beverage producing apparatus. One problem that arises in the prior art is that the temperature control system results in substantial wear and tear on the motor and drive assembly. As a result of the wear and tear, the motor and drive housing may tend to leak lubricant from its gear box and substantially shorten the life of the motor.

Slush beverages or granita has a consistency which is achieved by controlling a combination of the temperature of the liquid and the solid content in the liquid. For example, the solids content may be in the form of coffee solids, as well as sugar or fruit syrup solids. Prior art apparatus typically use torque to sense the consistency of the slush mix as it approaches a freezing point. The torque is sensed by twisting of the motor itself and pivoting thereby tripping a switch coupled thereto. The switch deactivates the cooling system.

When the beverage mixture approaches a desired consistency, the auger motor may tend to cycle on and off frequently. The frequent cycling on and off produces wear on the motor as well as increases the length of time required to freeze the beverage solution. Increased freeze time requires increased set up time and thereby increases the labor cost associated with an operation using such a machine. Additionally, an increased freeze time also increases the lead time in order to produce additional slush beverage when additional beverage mixture is added to the apparatus.

Prior art devices also may include an internal and external auger positioned in relation to the chilling portion. In such a configuration, the chilling portion includes a tubular drum with refrigeration coils are retained within the wall of the drum. An internal auger rotates relative to a cavity in the drum to drive beverage mixture therethrough. An external auger rotates relative to the external surface to move beverage solution thereagainst. While such configuration may be useful, it requires substantial maintenance as well as increases the difficulty in installation and repair of the apparatus.

The prior art devices are difficult when it is necessary to adjust the consistency of the slush. In other words, if an operator wishes to increase or decrease thickness of the consistency of the slush, the apparatus must either increase its chilling effect or reduce its chilling effect. Such adjustment is made by adjusting a screw and spring arrangement associated with the rotation of the motor. The spring is difficult to adjust and is typically located within the housing of the apparatus. Such adjustment is inconvenient and very cumbersome to accurately monitor while operating the apparatus.

Prior art devices also require an inordinate set up time. For example, at the beginning of an operating day, the prior art apparatus must be started up and the solution refrozen. Alternatively, the mixture may be maintained in its frozen state. An apparatus is not known to provide the ability to maintain the beverage mixture at a desired chilled state. Typically, the machine is turned off and the chilling process must be started anew at the beginning of each day.

Another problem with the prior art is that the controls are positioned on a front face panel of the machine. While the controls may be provided in a touch panel arrangement, the beverage mixture is still prone to splash and accumulate on such surfaces. As such, cleaning is required of these controlled surfaces. However, cleaning will inherently cause accidental activation of the switches thereby possibly subjecting the mixture to undesired unintentional adjustment.

Prior art apparatus also make it difficult to install, maintain and repair the chilling portion and auger associated therewith. As described above, some prior art apparatus include augers both internally and externally of the chilling portion. Such structures are inherently difficult to work on. However, external auger structures used with prior art devices are also difficult as they require complicated rod assemblies and fasteners. It would be desirable to provide an auger assembly which is easily installed, easily removable for cleaning, and easily removable and can be easily assembled for repair. Additionally, it would be desirable to provide an auger assembly which does not employ hardware as such hardware may be prone to disengagement and dispensing into a beverage mixture.

It is desirable to provide an apparatus which includes a hopper of sufficient capacity to provide a reasonable amount of slush beverage on demand. Such hoppers should be covered in order to prevent contamination by airborne particles, maintain sanitation and to prevent splashing. Prior art devices employ a cover which are unidirectional such that they are oriented for display in only one direction. Additionally, such covers have an internal cover line which requires additional cleaning and is proned to frequent contact with the slush beverage. Contact occurs as a result of the formation of a churning hump. The churning hump results from the auger driving the slush beverage from the rear of the hopper towards the front of the hopper. The need to clean the internal surfaces of this cover require additional labor time and may not always occur.

A slush beverage apparatus as described hereinabove and as will be described in greater detail with regard to the present invention requires the cooling of a beverage in a hopper which has some surface area exposed to ambient atmosphere. As a result, it is common for condensate to accumulate on the exterior surfaces of the hopper. The condensate drips from the hopper and is accumulated and drained away. Prior art apparatus have positioned air flow pattern such that air is required to flow from side to side of the machine in order to provide air flow to move the condensate. The air flow is also important in order to flow over a condenser coil as required by the coolant system. However, the side to side air flow creates a problem in the food service industry where floor space or counterspace is at a premium. In this regard, the prior art design prohibits placing the slush beverage dispenser flush against walls or other apparatus as the side must be exposed for cooling and evaporation purposes.

As described above, there are numerous problems with the prior art which it would be desirable to solve. Heretofore, it is unknown to Applicant that these problems have been solved.

BRIEF DESCRIPTION OF THE DRAWINGS

The organization and manner of the structure and function of the invention, together with the further objects and advantages thereof, may be understood by reference to the following description taken in connection with the accompanying drawings, wherein like reference numerals identify like elements, and in which:

FIG. 13 is a partial fragmentary, cross-sectional, side elevational view of a motor for attachment to the motor shaft assembly to drive the auger externally of the cooling drum;

FIG. 14 is an enlarged, partial fragmentary, cross-sectional, side elevational view of a torsion spring assembly for sensing the rotation of and torque on the motor shaft assembly.

FIG. 15 is a partial fragmentary, cross-sectional, side elevational view taken along line 15—15 in FIG. 14 showing protrusions used in sensing the torque on the motor shaft;

FIG. 15A is a top plan view taken along line 15A—15A as shown in FIG. 15;

FIG. 16 is an enlarged exploded perspective view of the auger assembly;

FIG. 17 is a front elevational view of an auger nose component;

DESCRIPTION

Figure 1:
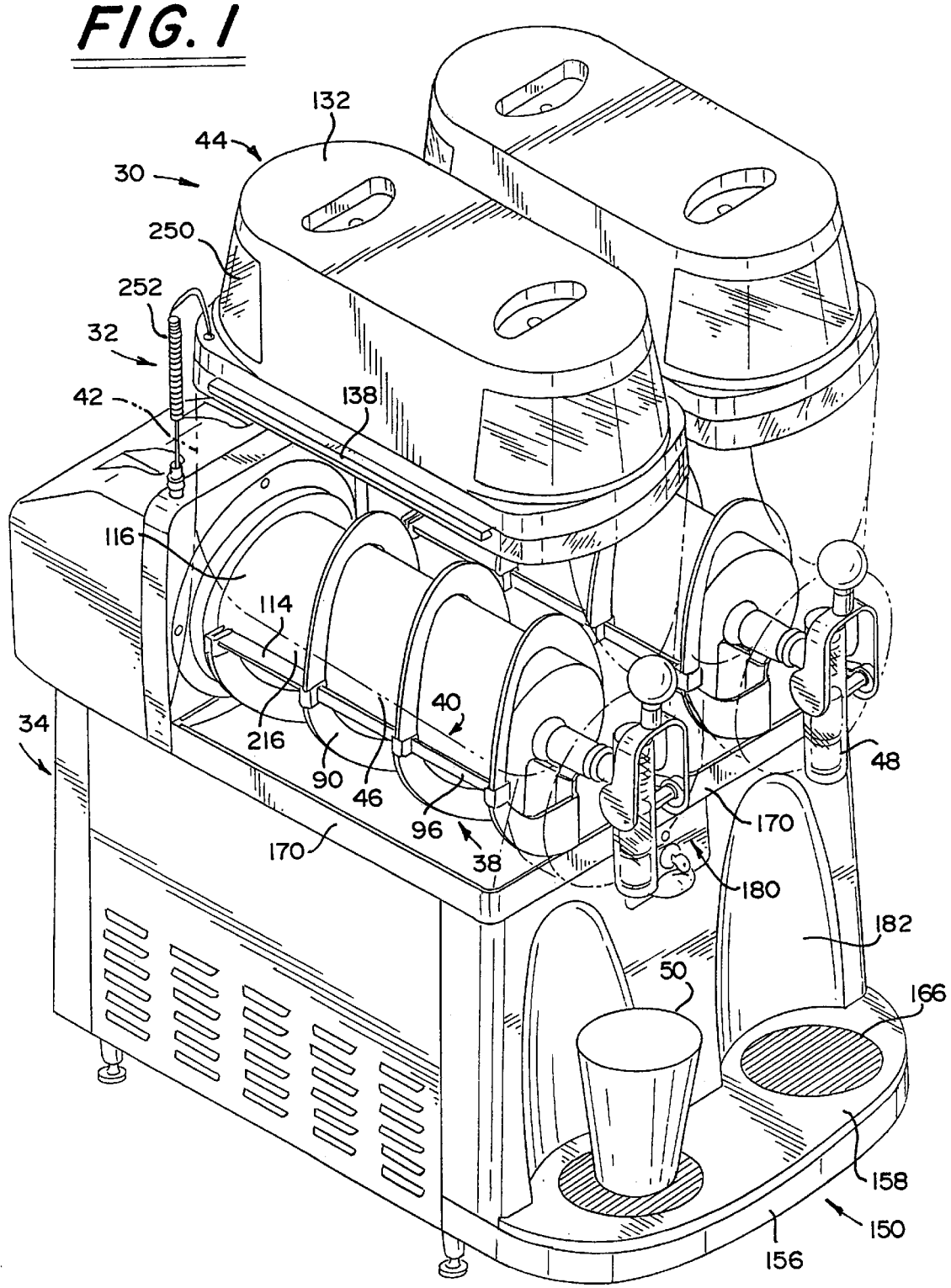
FIG. 1 is a top, front, left-hand perspective view of a slush beverage apparatus of the present invention.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 2:
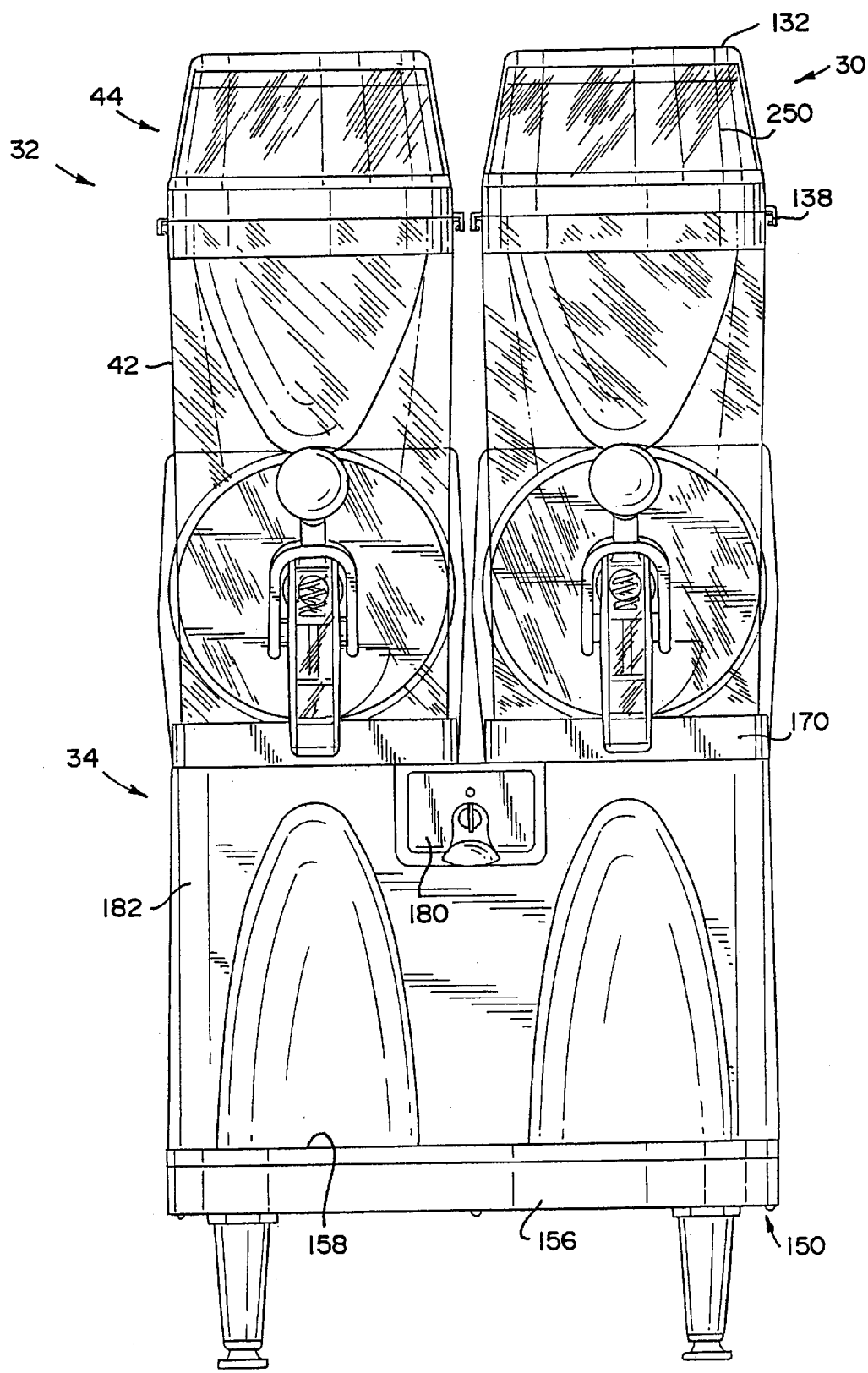
FIG. 2 is a front elevational view of the apparatus as shown in FIG. 1.
Figure 3:
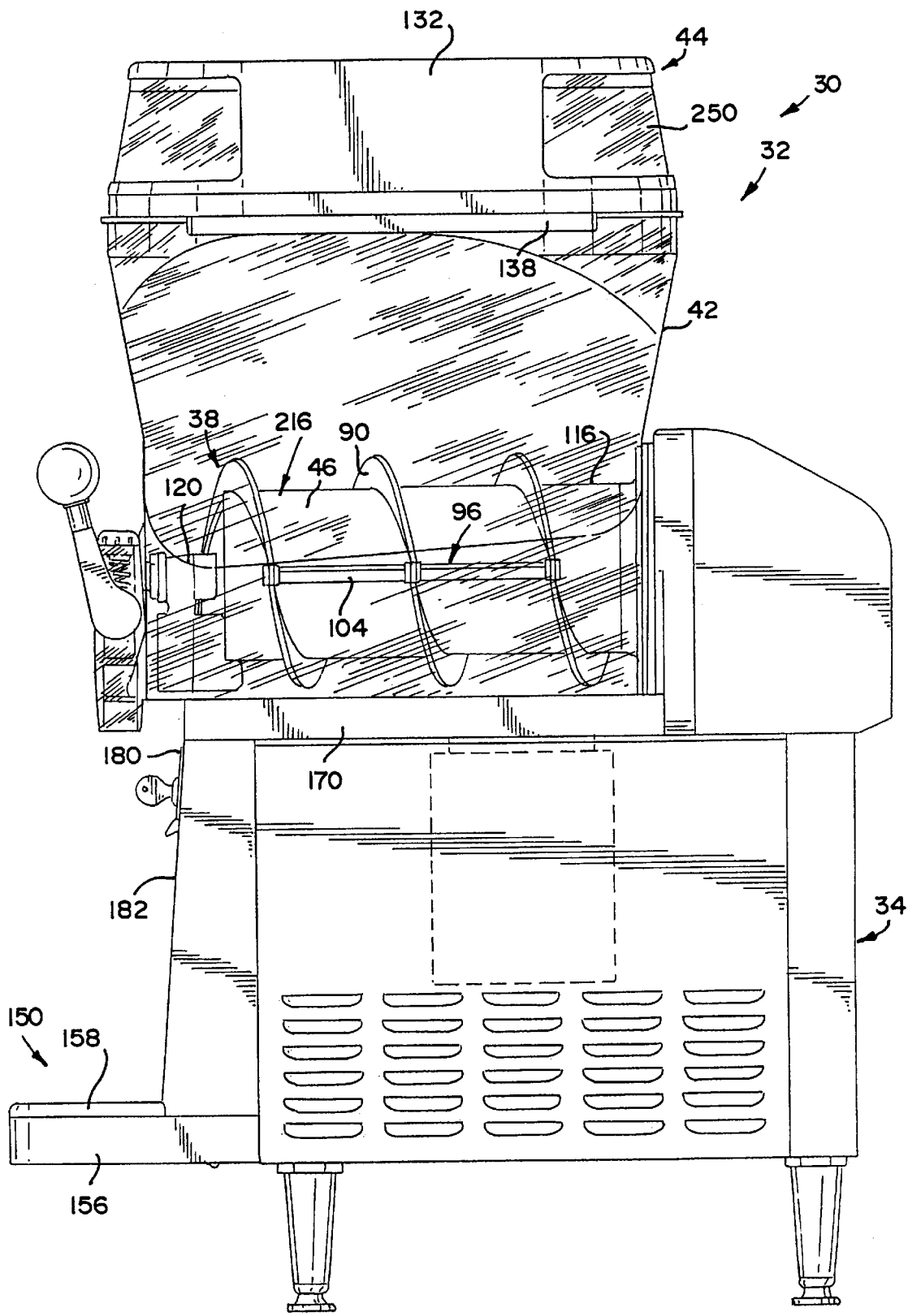
FIG. 3 is a right-side, partial fragmentary elevational view of the apparatus as shown in FIGS. 1 and 2.
Figure 7:
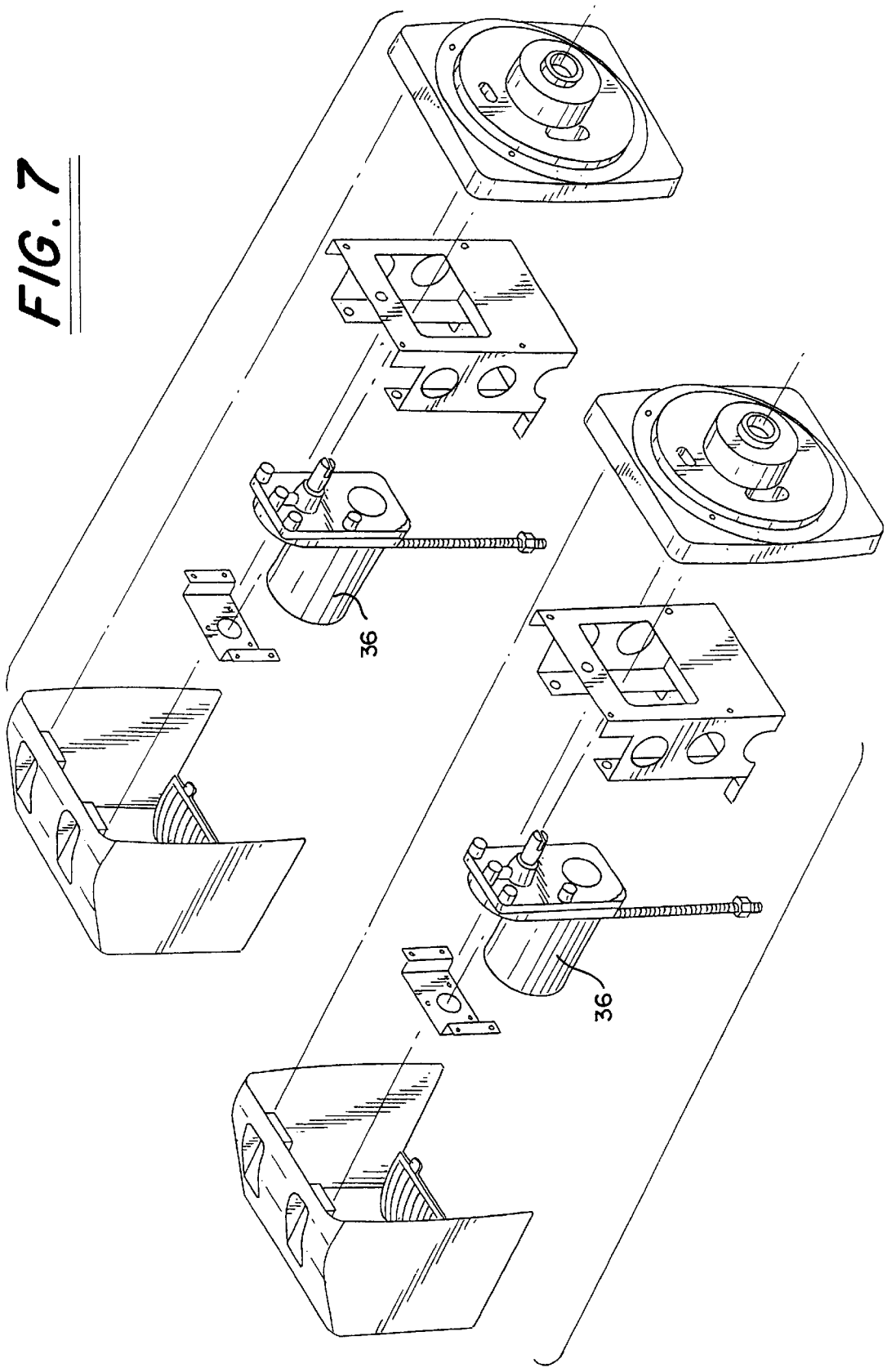
FIG. 7 is an exploded, perspective view of a motor and housing assembly.

With reference to the figures, a chilled or slush beverage apparatus 30 is shown in perspective in FIG. 1. The beverage apparatus 30 includes at least one hopper assembly 32 which is retained on a housing 34. As will be described in greater detail hereinbelow, the housing 34 includes an auger drive motor 36 (FIG. 7) and a coolant system 200 (see FIG. 32). The auger drive motor 36 as mentioned above drives an auger assembly 38 which is positioned proximate to a chiller assembly 40, both being retained within a corresponding hopper assembly 32. It should be noted that while a two-hopper apparatus is shown in FIG. 2, it may be desirable to provide a single hopper as well as three or more hoppers.

Briefly, the apparatus 30 is operated by placing a beverage solution in a selected hopper 42 of the hopper assembly 32, positioning a cover assembly 44 on top of the hopper 42 and activating the apparatus. Activation of the apparatus will result in rotation of the auger assembly 38 within the hopper and initiation of a cooling cycle. Cooling is provided by the chiller assembly 40. As an external surface 46 of the chiller assembly 44 begins to cool, the temperature of the beverage solution is decreased. The auger 38 revolves to mix the beverage solution within the hopper 42. The auger assembly 38 includes a helically configured blade which is positioned in close proximity to the external surface 46 of the chiller assembly 40. As the beverage solution is cooled, ice crystals form in the solution. As the ice crystals form, generally on or near the surface 46 of the chiller assembly 40, the auger assembly 3 8 removes these crystals from the surface 46. When a desired beverage consistency is attained, beverage may be dispensed through a dispensing nozzle 48 into a container 50 positioned therebelow.

Figure 8:
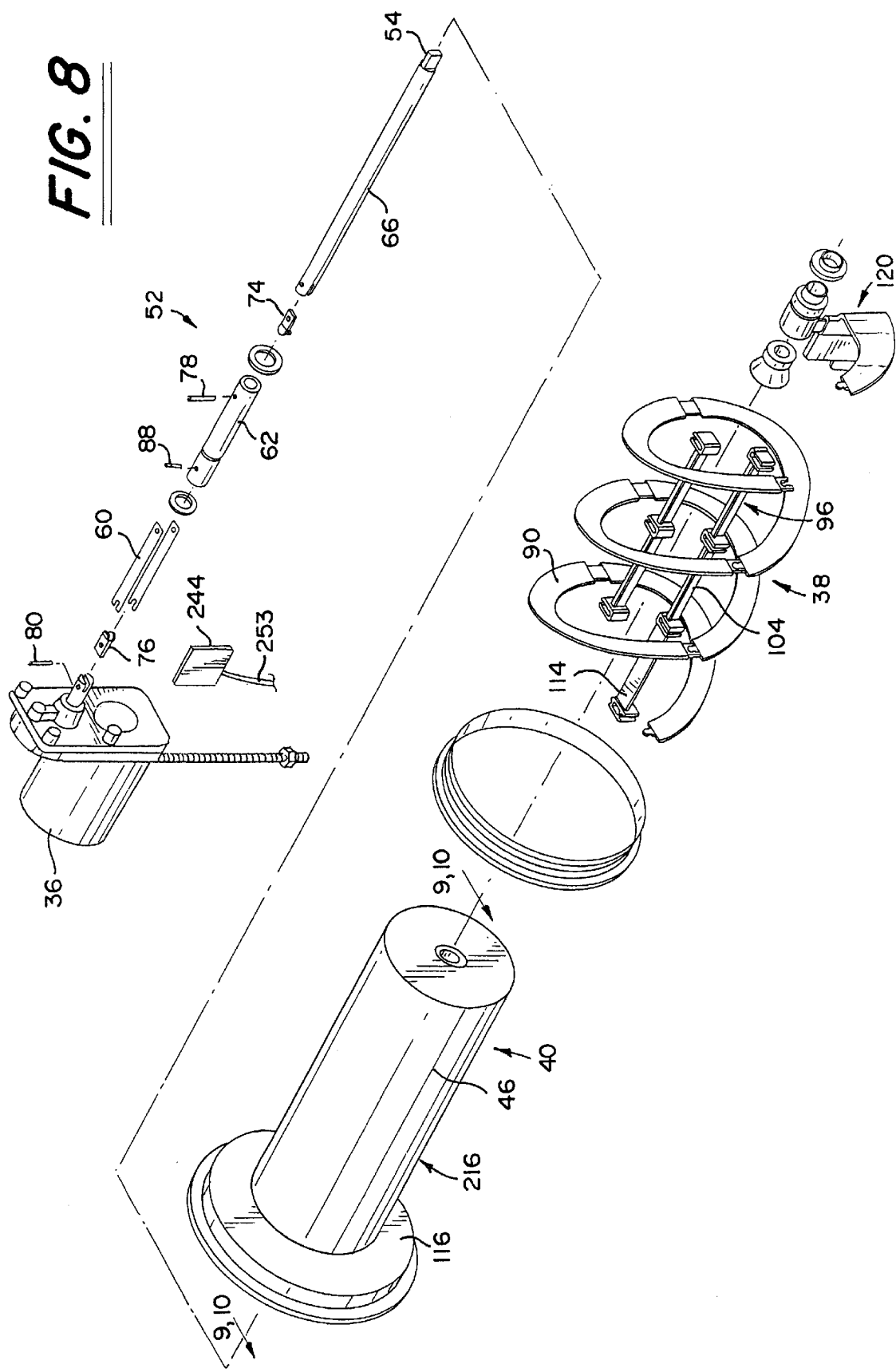
FIG. 8 is an exploded, perspective view of an auger assembly, chiller assembly, and motor shaft assembly.

Having now briefly described the general structure and operation of the present invention, we now turn a more detailed discussion of the various structures of the apparatus. More particularly, we turn now to FIG. 8 which shows a motor shaft assembly 52. With further reference to FIGS. 12–15, the motor shaft assembly 52 is connected to the drive motor 36. Operation of the motor 36 rotates the motor shaft assembly 52 attached thereto and correspondingly rotates the auger assembly 38 attached to a distal end 54 of the motor shaft assembly 52. It should be noted, that in the present invention, the motor shaft assembly 52 extends through a hollow bore 56 within the chiller assembly 40. When the drive motor 36 is operated, the rotation of the motor shaft assembly 52, driving the auger assembly 38 causes movement of the beverage solution through the hopper 42.

Figure 12:
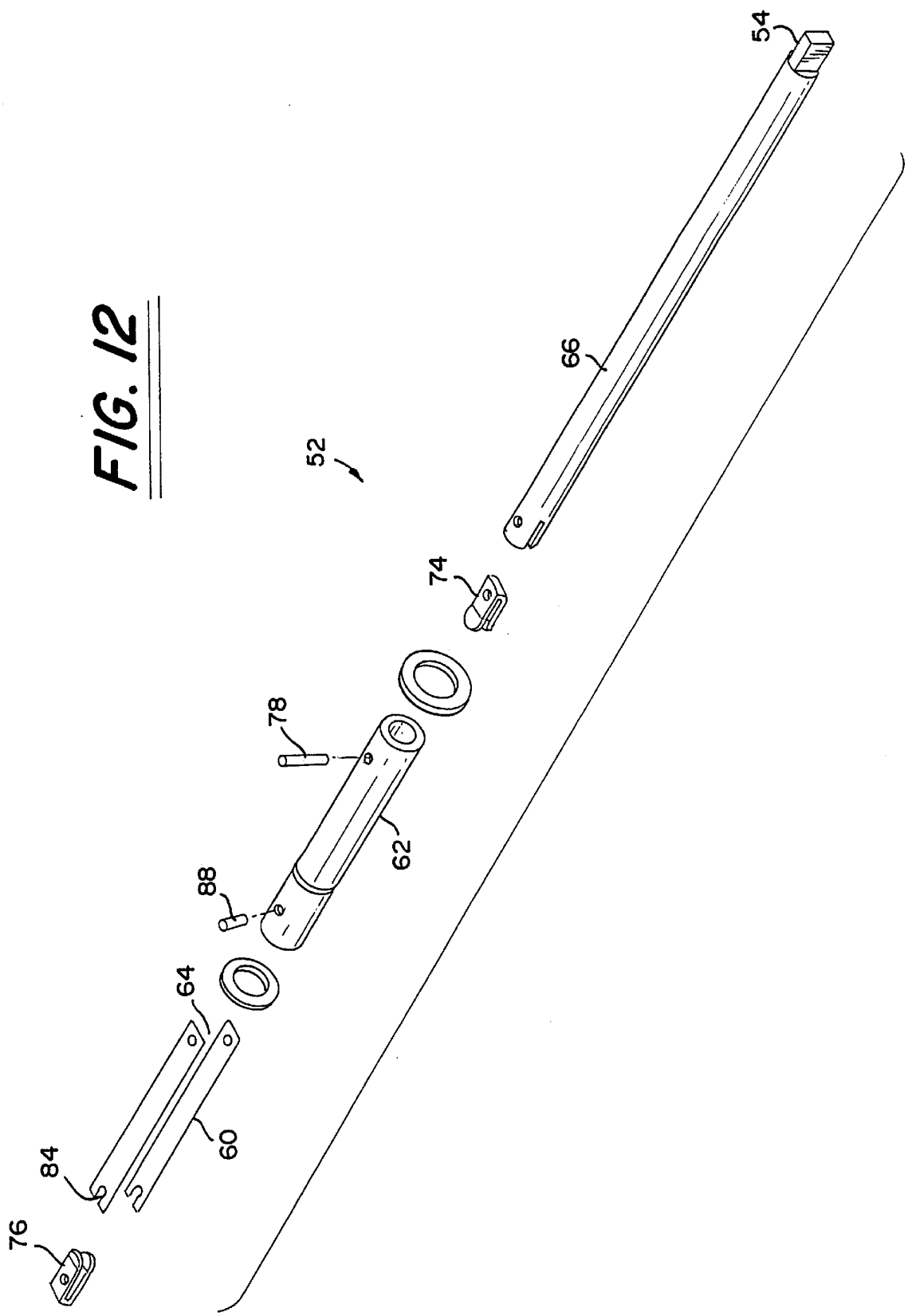
FIG. 12 is an exploded, perspective view of the motor shaft assembly.

An enlarged, exploded view of the motor shaft assembly is shown in FIG. 12. The motor shaft assembly includes a resilient coupling which preferably comprises a pair of torsion springs 60 positioned within a torsion spring retainer 62. As shown in FIG. 14, a first end 64 of the torsion springs 60 is retained on an auger shaft 66. A second end of the torsion springs 68 is retained on a motor shaft 70. A central portion 72 of the torsion springs are housed within the torsion spring retainer body 62. The ends 64,68 are positioned in torsion spring bearings 74,76, respectively retained on the auger shaft 66 and the motor shaft 70.

The assembly 52 is retained as shown in FIG. 14 by use of a first pin 78 extending through the retainer 62, auger shaft 66, bearings 74 and torsion springs 60. A second pin 80 extends through a slot 82 in the retainer 62 in a corresponding slot 84 in the second end 68 of the torsion springs 60. The slot in the torsion spring 60 allows the assembly 52 to be easily removed from and attached to the motor. With further reference to FIG. 15, it can be seen that the slot 82 in the retainer allows for a degree of angular movement or rotation of the retainer 62 relative to the motor shaft 70. A reference pin 88 is provided on the retainer 62 so that the relative angular movement of the pins 80,88 can be sensed by a torque sensor 244 positioned in close proximity thereto. Sensing of the angular movement of these pins 80,88 is used in controlling solenoid valves 212,214 and the compressor 202 while the motor operates. Sensing the angular movement is achieved by measuring the elapsed time between pins and combining it with the elapsed time for a complete revolution to arrive at a percent of revolution value for the spacing between pins. This method compensates for variations in motor speed due to manufacturing tolerances and instantaneous load variations which have a slight effect on motor speed.

Figure 33:
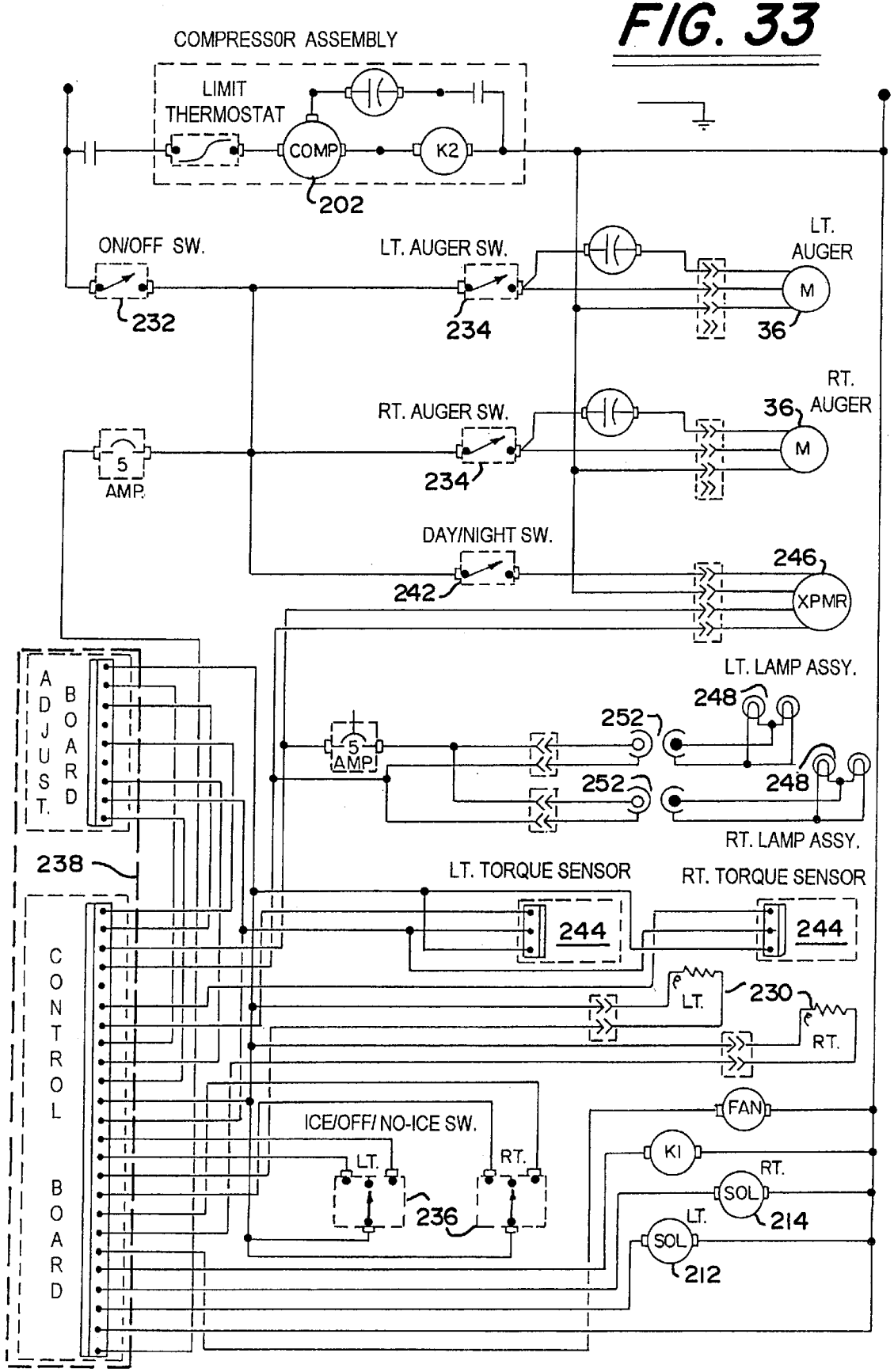
FIG. 33 is an electrical schematic of the control system employed in the present invention.

As further shown in the schematic diagram of FIG. 33 and in the partial fragmentary view of FIGS. 14, 15 and 15A, an electronic sensor assembly or sensor 244 monitors the torque as the result of the rotation or twisting motion sensed by movement of the displacement of the pins 80,88. The slot 82 provides a space for relative, yet limited, motion of the retainer 62 relative to the drive shaft 70. The torsion springs 60 provide a degree of resistance to the twisting motion. The sensor assembly 244 includes a printed circuit board 245 to which is attached a pair of sensors 247,249. The pins 80,88 rotate through a rotational path 251 between the sensors 247,249 breaking a beam path 253 therebetween. The circuit board 245 of the assembly 244 is connected to the controller via line 253. A degree of deflection 255 between the pins 80,88. It should be noted that the sensor as described herein is a single sensor which is used on either the left or right side. As shown in the schematic diagram of FIG. 33, two torque sensors, a left and a right torque sensor are provided. Additional torque sensors may be provided for additional hoppers, if needed.

Twisting is measured by checking the elapsed time between rotations of the reference pin 88 relative to the second pin 80. The lapse time sensed between the pins approximate an angular deflection 255. When a predetermined amount of angular deflection is sensed, the compressor is deactivated thereby preventing further chilling, yet rotation of the auger is maintained so as to maintain consistency of the beverage mixture. In this way, the present invention senses the torque on the motor shaft assembly 52 without imposing additional wear and tear on the motor 36. This greatly enhances the life and reliability of the motor 36, provides greater accuracy in controlling the cooling cycle, and provides for greater control and adjustment in sensing these conditions.

Figure 18:
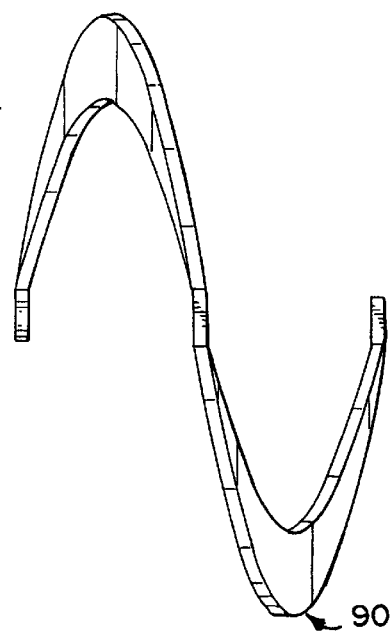
FIG. 18 is a side elevational view of one auger section used in constructing the auger.
Figure 19:
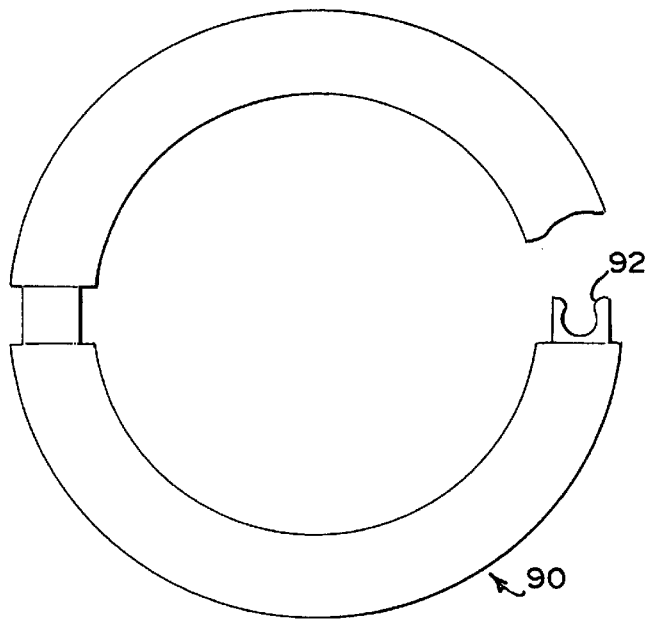
FIG. 19 is a right-side elevational view of the auger as shown in FIG. 18 showing an interlocking receptacle used in assembling the auger assembly.
Figure 20:
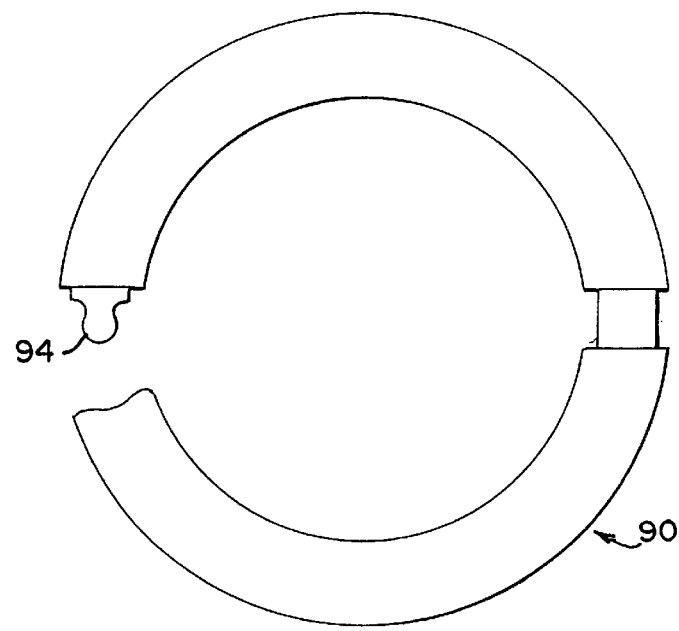
FIG. 20 is a left-side elevational view of the auger section as shown in FIG. 18 showing an interlocking protrusion which can be coupled with the interlocking recess as shown in FIG. 19 when assembling the auger sections as shown in FIG. 16.
Figure 21:
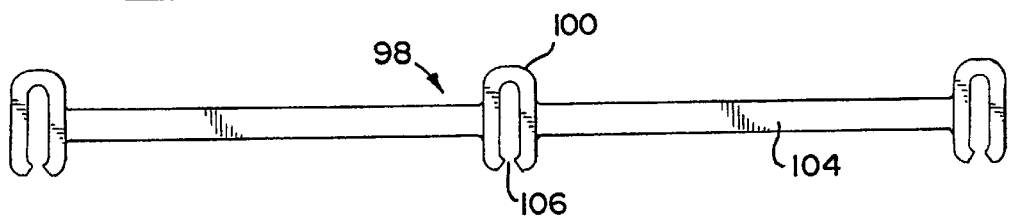
FIGS. 21–24 are auger latch bars which are attached to necked areas on the auger assembly for retaining spacing of the auger blade portion and maintaining structural rigidity of the auger assembly, FIGS. 23 and 24 include a perpendicular end scrapper which is positioned toward the rear of the chiller portion for initiating movement of beverage solution along the cooling drum upon rotation of the auger.
Figure 22:
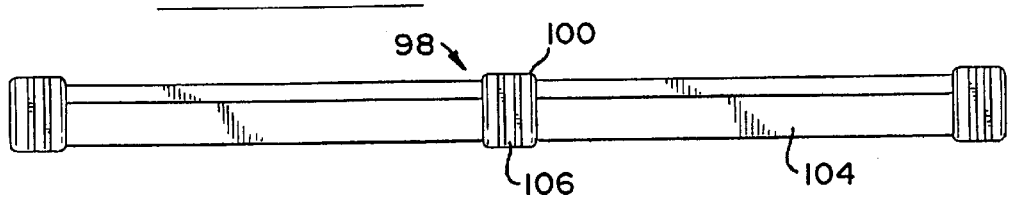
Figure 23:
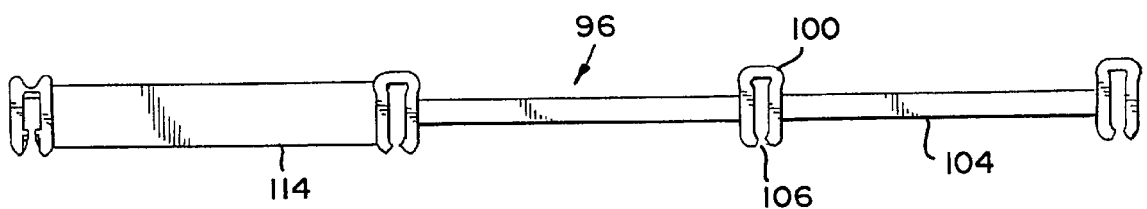
Figure 24:
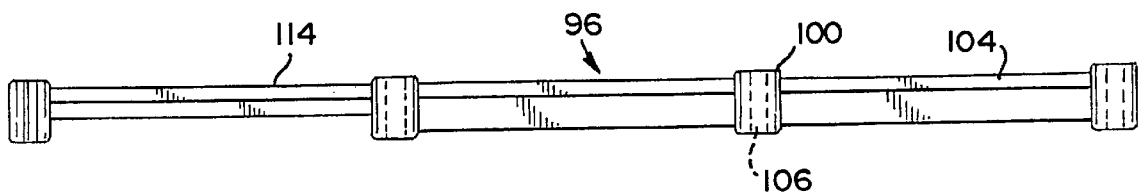

Turning now to the auger assembly 38 which is driven by the motor 36 and the motor shaft assembly 52, the auger assembly 38 as shown includes three auger sections 90. One of the auger sections 90 is shown in FIGS. 18–20. Three identical auger sections 90 are connected by interlocking structures 91 on opposite ends thereof. As shown in FIG. 19, an interlocking recess 92 is provided on one end of the auger section 90 while an interlocking protrusion 94 is provided on the opposite end of the auger section 90. By connecting the interlocking portions 92,94, the auger sections 90 can be coupled to create the larger continuous helical blade of the auger assembly 38.

These auger sections 90 are retained in engagement by auger latch bars 96,98 which have clips 100 for engagement with necked areas 102 on the auger sections 90. The clips are attached to and spaced apart by cross members 104. As shown in FIGS. 21–24, the clips 100 are configured with a reduced dimension mouth 106 to provide snap-fit engagement over the necked areas 102. The necked areas 102 are also provided in the area where the interlocking structures 92,92,94 are mated. As such, the clips 100 also assure that the interlocking structures 91 will not become disengaged during rotation of the auger. The cross members 104 also provide desired spacing between the sections 90 to prevent shifting of the auger sections 90 during rotation. It should be noted that the auger latch bar 96 includes four clips which attach to a first 110 and a second 112 terminal end of the three attached auger sections 90. A cross member 114 positioned near the first terminal end is oriented generally perpendicular to the other cross members 104. The perpendicular cross member 114 provides a driving action on the beverage solution positioned towards the base 116 of the chiller assembly 40.

The second terminal end 112 positioned towards the front of the apparatus includes an auger nose 120 attached thereto. The auger nose 120 includes a sweeping blade 122. A cap end 124 of the auger nose 120 attaches to the distal end 54 of the motor shaft assembly 52. As such, connection of the cap end 124 to the motor shaft assembly 52 results in rotation of the auger assembly 38. Generally, driving forces are transferred from the motor shaft 52 to the auger nose 120. The series of auger sections 90 attached to the auger nose 120 are pulled or rotated around the outside 46 of the chiller assembly 40. This driving and sweeping action pull the beverage mixture from the rear of the hopper towards the front of the hopper.

Figure 4:
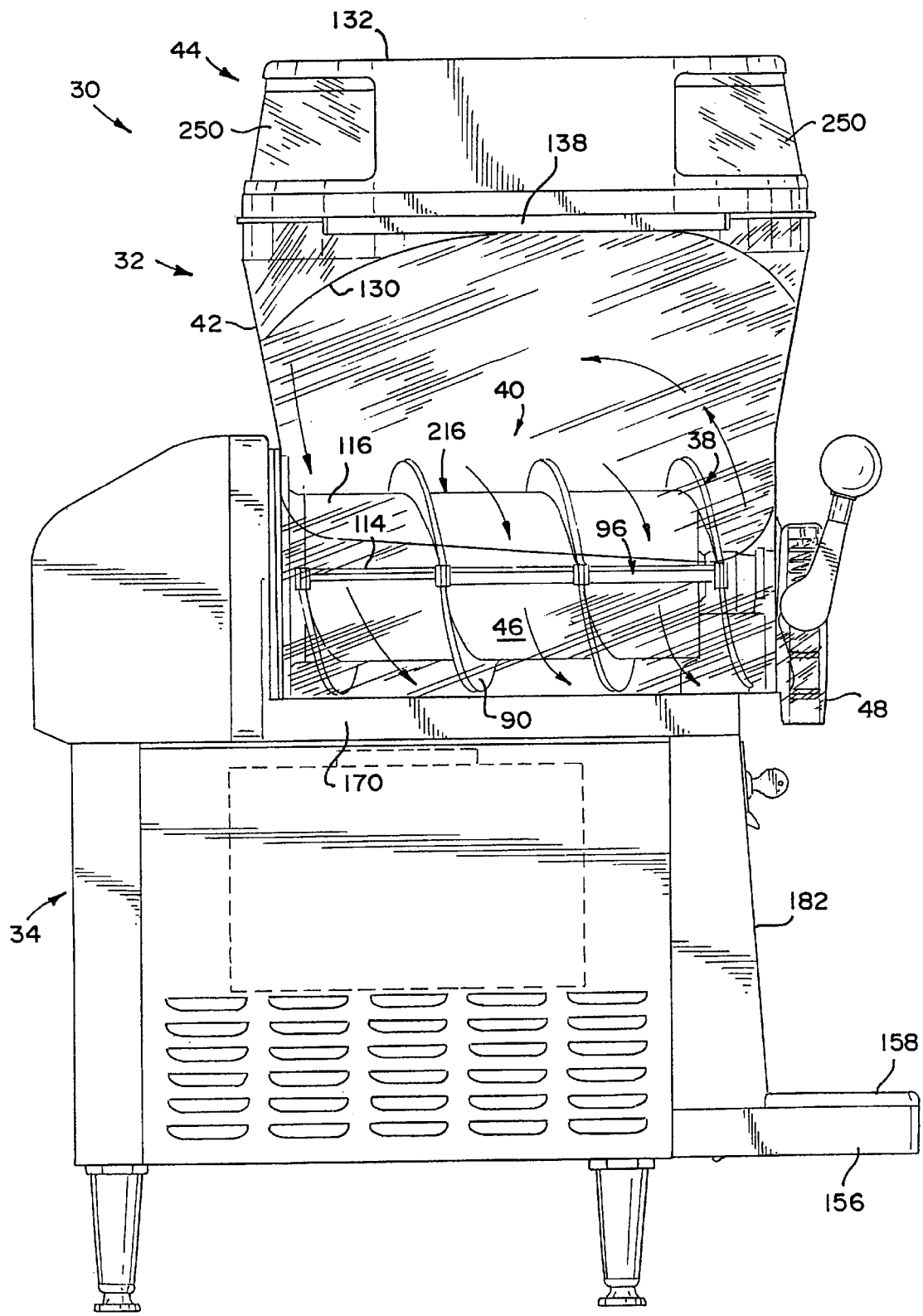
FIG. 4 is an enlarged left-side; elevational view of the apparatus as shown in FIGS. 1–3.
Figure 5:
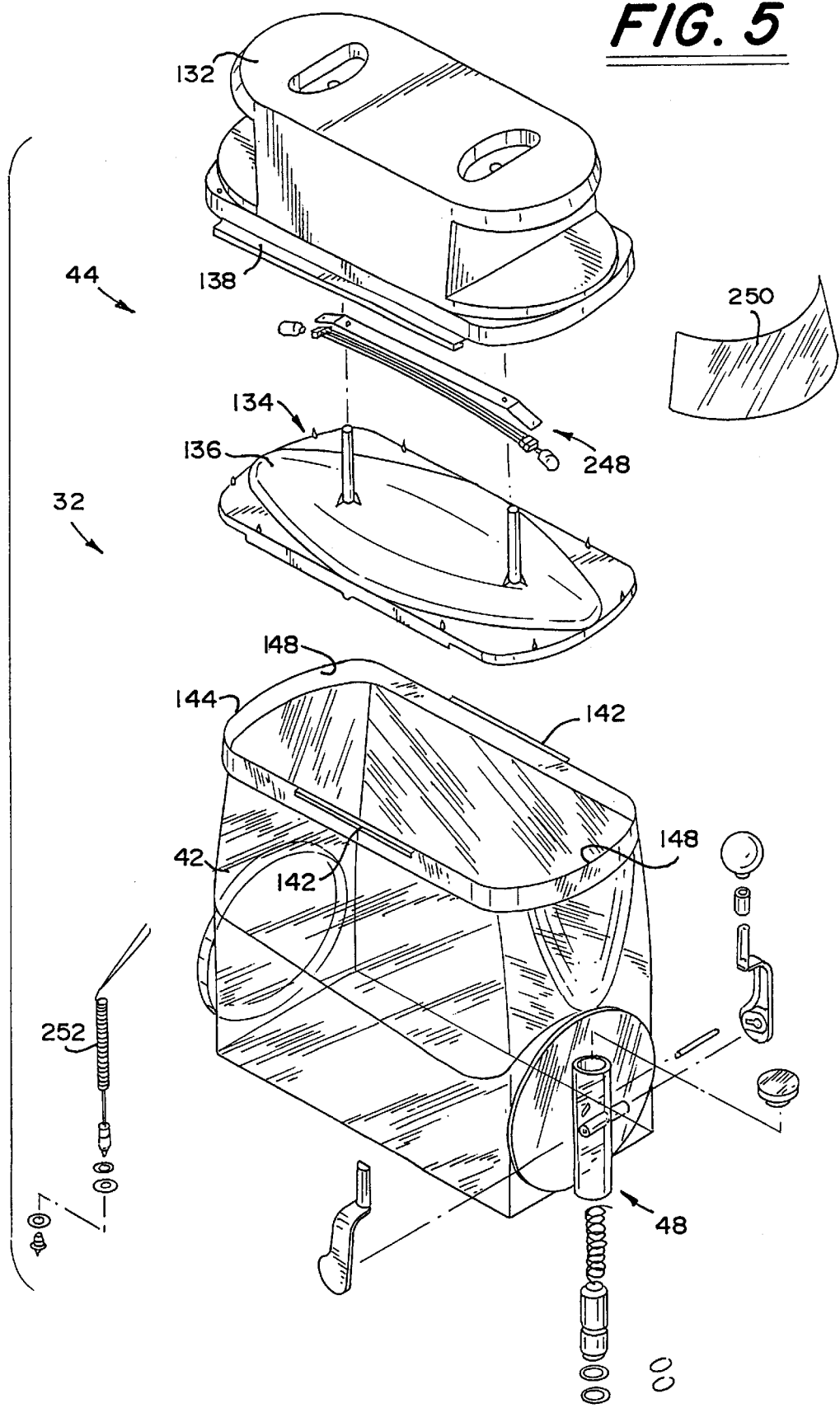
FIG. 5 is an exploded, perspective view of a hopper assembly of the present invention.
Figure 25:
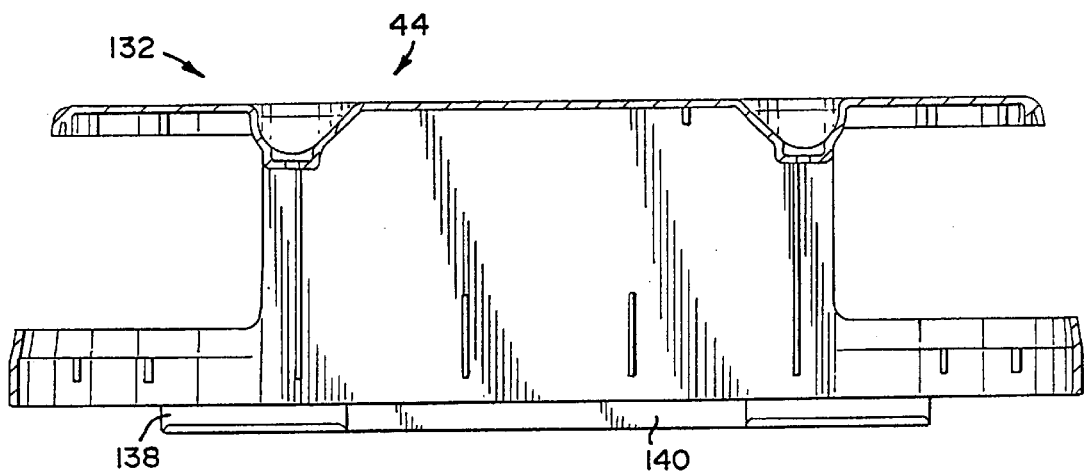
FIGS. 25 and 26 show a hopper cover assembly in which a cover liner (FIG. 26) is removed from a hopper cover (FIG. 25), shown in cross-section, show the relationship between these components and the attachment structures for mounting the hopper cover assembly on the mouth of a hopper (FIG. 27)
Figure 26:
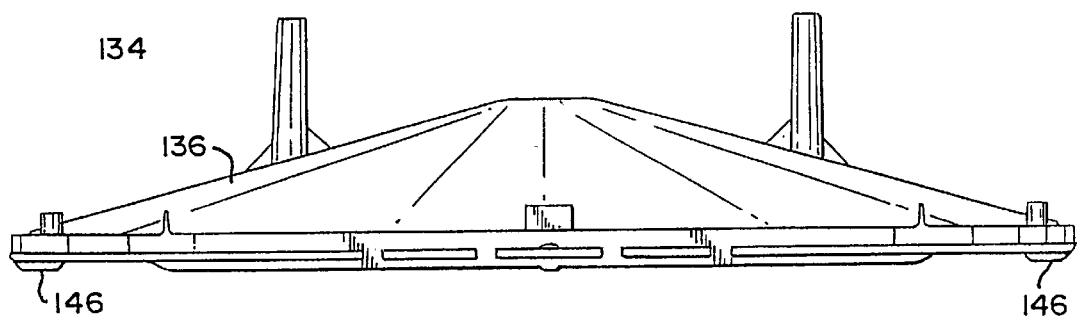
Figure 27:
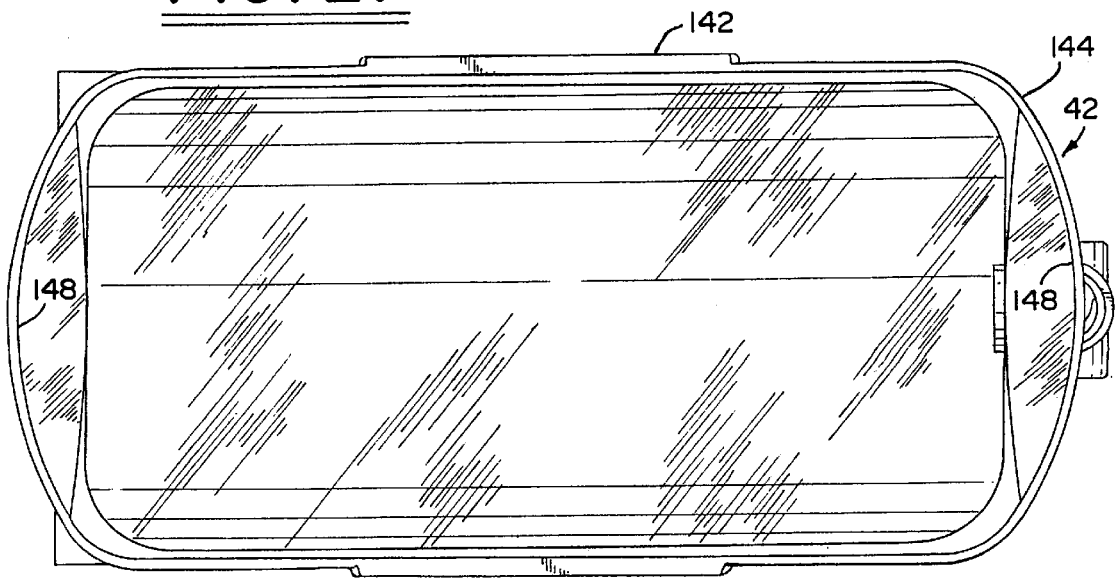
Figure 31:
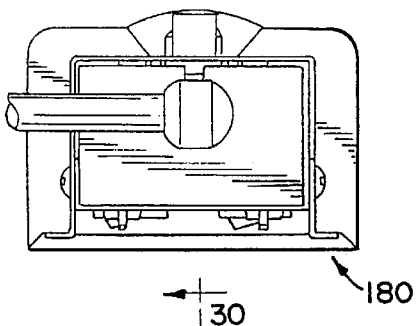
FIGS. 28–31 show a top, front, partial fragmentary, cross-sectional, side elevational view, and a rear view of a control panel drawer as used in the present invention.

Mixture which is pulled from the rear of the hopper is pulled downwardly into the auger path and mixture which is pushed from the front of the hopper is pushed upwardly over the auger. As the result of pulling and pushing of the beverage mixture, a churning hump 130 (see, FIG. 4) tends to form in a middle portion of the hopper. When a hopper is filled with beverage solution, the hump tends to rise towards the cover assembly. In this regard, the cover assembly 44 includes the cover 132 having a cover liner 134 retained therein. In the present invention, the cover liner 134 is provided with a concave recessed area 136. As can be seen in FIGS. 25–27, in the recessed area 136 the concave portion faces the inside of the hopper to accommodate the churning hump 130 positioned thereunder. As a result, the churning hump 130 does not touch the inside surface of the cover liner 134 thereby eliminate additional cleaning problems which are encountered with the prior art devices.

With further reference to FIGS. 25–27, the hopper cover includes a mounting channel 138 having a central opening 140 therein. A flange rail 142 formed on an upper edge 144 of the hopper 42 is received in the central opening 140. Centering ribs 146 are provided on either end of the cover liner 134. As noted above, the liner cover 134 is retained in the hopper cover 132 with the flange rail 142 received in the central opening 140 of the hopper cover assembly 44, the centering ribs 146 rest against inside surfaces 148 of the hopper 42 thereby centering the hopper cover assembly 44 on the upper edge 144. The hopper cover assembly 44 can be removed by lifting it off of the hopper 42.

Alternatively, it may be desirable only to slightly displace the hopper cover assembly 44 and not necessarily completely remove the assembly therefrom. As such, the present invention allows the hopper cover assembly 44 to be slidably displaced parallel to the flange rails 142. A slight force applied to either end of the hopper cover assembly 44 sufficient to overcome the interference created by the centering rib 146 against the inside surface 148 of the wall will result in the cover assembly 44 slidably moving. Slidable movement is achieved with the mounting channel 138 being retained on and sliding along the flange rail 142. The present invention allows the hopper cover assembly 144 to be displaced in either direction along the upper edge 144 of the hopper 42 generally parallel to the flange rails 142. This allows an operator to access the hopper from either end, for example, to add additional beverage solution.

Figure 6:
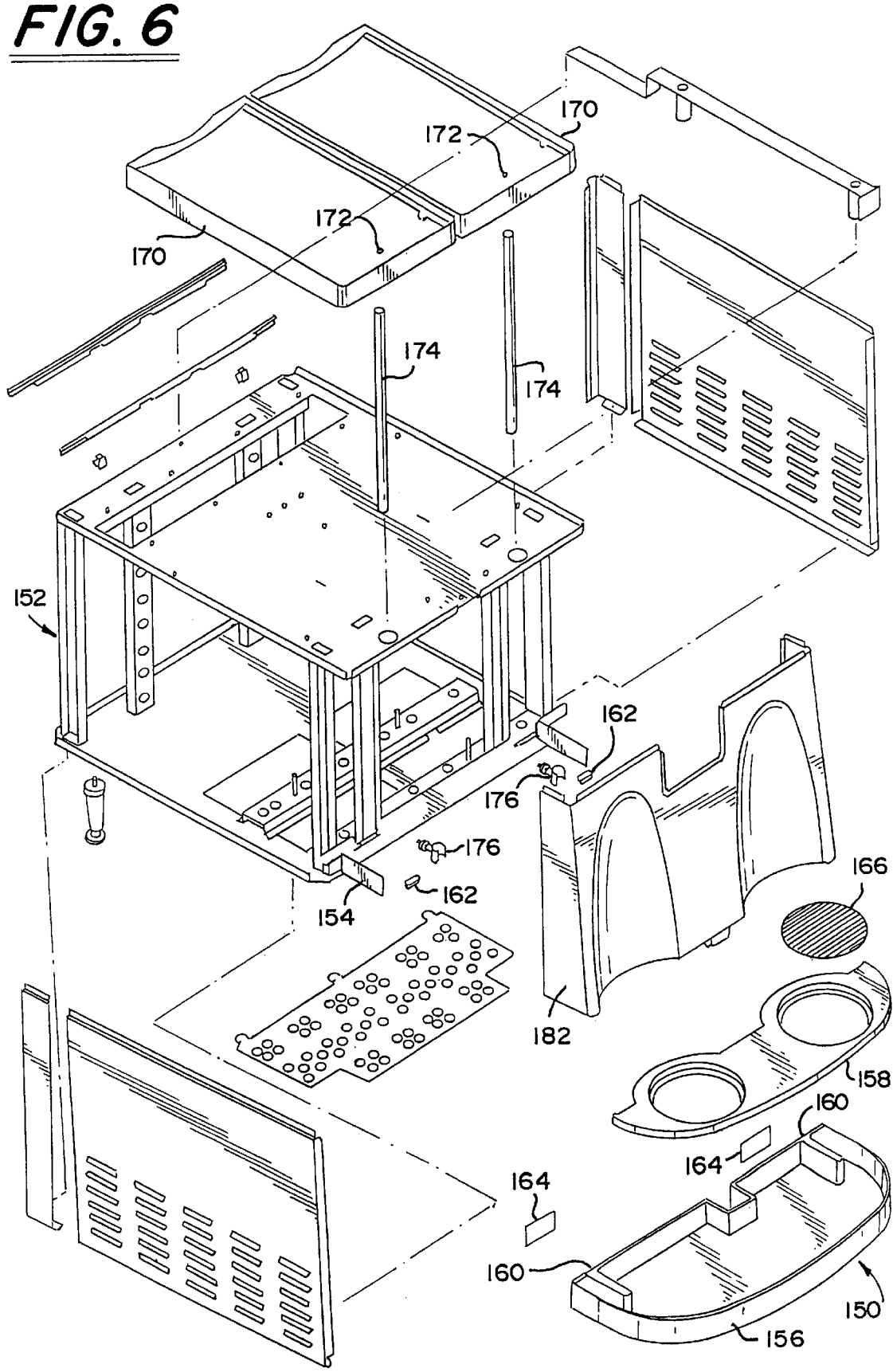
FIG. 6 is a partial exploded view of a housing and chassis assembly of the present invention.

With further reference to FIG. 6, a drip tray assembly 150 is attached to a front portion of the chassis 152. A pair of tray arms 154 extend from the chassis 152. The drip tray assembly 150 includes a server drip pan 156 and a drip tray cover 158 positioned over the pan 156. The pan 156 is formed with a pair of spaced apart slots 160 formed therein for receiving the tray arms 154. A pair of magnets 162 are attached to the chassis 152. The magnets 162 are positioned for attraction to metal plate 164 attached to the drip pan 156. Alternatively, the drip pan 156 may be formed of a metal material instead of plastic as in the preferred embodiment thereby eliminating the need for metal plates 164 thereon.

In use, the drip pan 156 with the cover 158 thereon and having a grate 166 retained in the cover 158 can be attached to and removed from the chassis 152 without complication. To remove the drip tray assembly 150, the pan and cover 156,158 are grasped and removed from the chassis 152. A nominal force is applied to the drip tray assembly 150 to overcome the attractive forces between the magnets 162 and the corresponding metal plates 164. The pan 156 is moved in order to disengage the slots 160 from the corresponding tray arms 154. Once removed from the chassis 152, the drip tray assembly 150 can be disassembled, cleaned, and returned to service. When returned to service, the slots 160 are positioned over the corresponding arms 154 and slid into position in order to engage the metal plate 164 with the corresponding magnet 162. The magnet and metal plate 162,164 retain the assembly 150 in place.

A hopper drip tray 170 is provided underneath the hopper 42. The hopper drip trays 170 collect condensation which forms on and runs off of the outside surface of the hoppers 42. A drain hole 172 is provided in each tray 170 which communicates with a drain tube 174 retained relative to the chassis by a clip 176. Condensate from the hoppers drain into the drip tray assembly 150 for evaporation or disposal in due course.

A control panel drawer 180 is provided in the front panel 182 of the housing 34. With reference to FIGS. 28–31, the control panel drawer 180 includes a drawer frame 184 in which is retained a control panel 186 and control devices 188. The control panel drawer 180 allows the controls to be completely removed from the serving area, thus avoiding splashing or the accumulation of beverage substance thereon. It is particularly helpful when considering that many of the beverage substances include sugar components and therefore can be quite sticky and easily damage control devices. Additionally, the orientation of the control devices on the control panel 186 within the drawer 184 allow the control devices to be sufficiently large to facilitate case of use of the controls. Additionally, a lock device 190 is provided on the drawer 184 in order to prevent unauthorized access to the control. A drawer stop 192 is provided on a bottom portion of the drawer to allow the drawer to be fully extracted from the housing while retaining it in engagement therewith.

Figure 9:
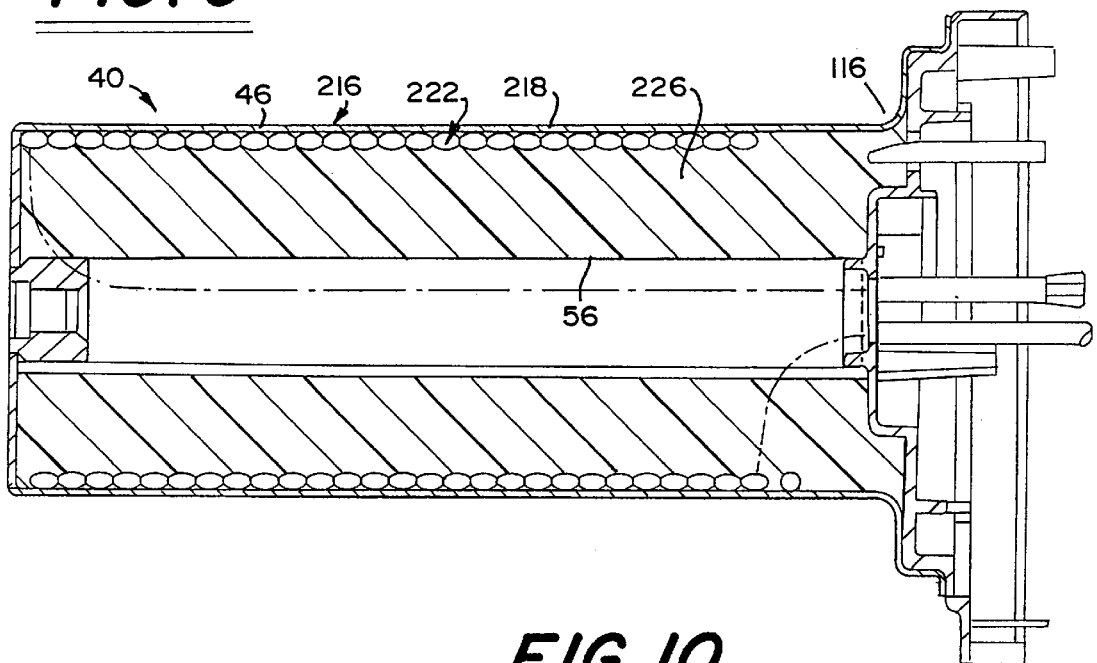
FIG. 9 is a partial fragmentary, cross-sectional, side elevational view of the chiller assembly taken along line 9—9 in FIG. 8 showing a refrigeration coil retained within a cavity of a cooling drum.
Figure 10:
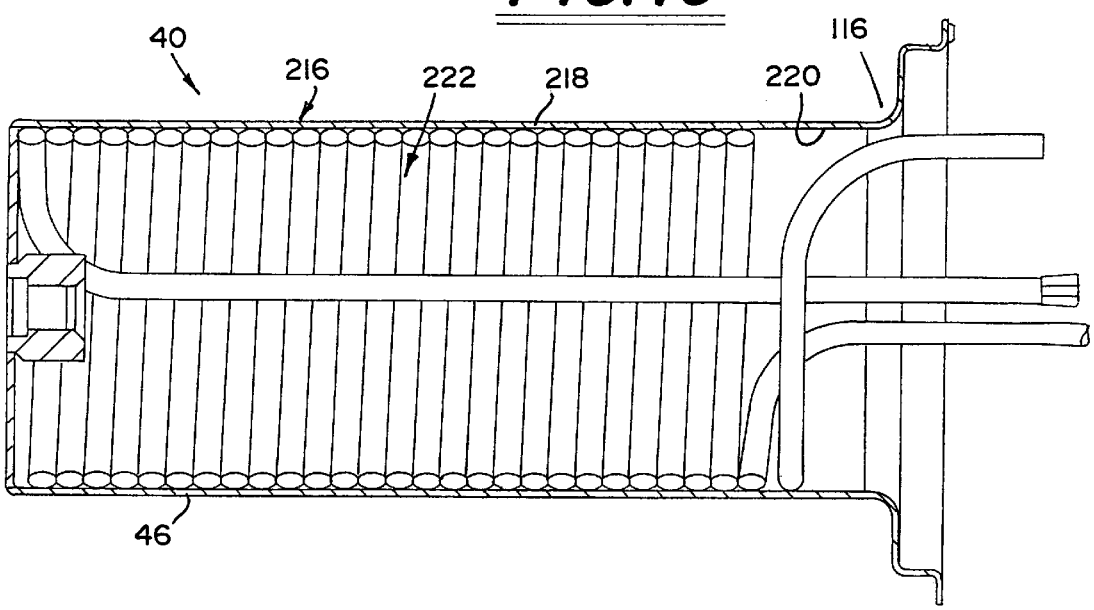
FIG. 10 is a partial fragmentary, cross-sectional, side elevational view taken along line 10—10 in FIG. 9 in which insulation has been removed from the cavity of the cooling drum to better show the configuration of the refrigeration coil retained therein.
Figure 11:
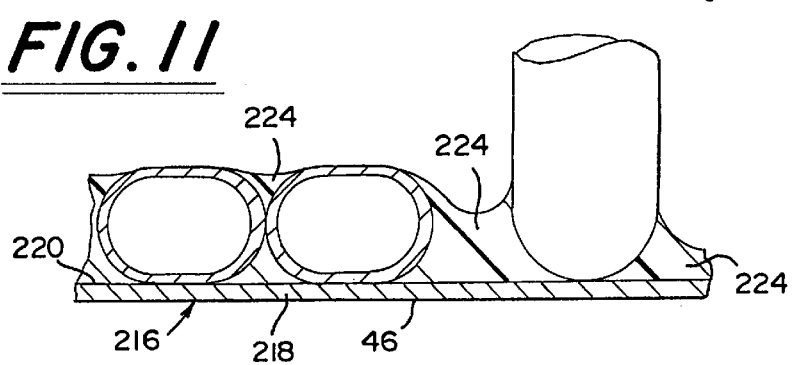
FIG. 11 is an enlarged, partial fragmentary, cross-sectional view showing thermally conductive epoxy applied to the refrigeration coil to increase the thermal conductivity between the coil and a wall of the cooling drum.
Figure 32:
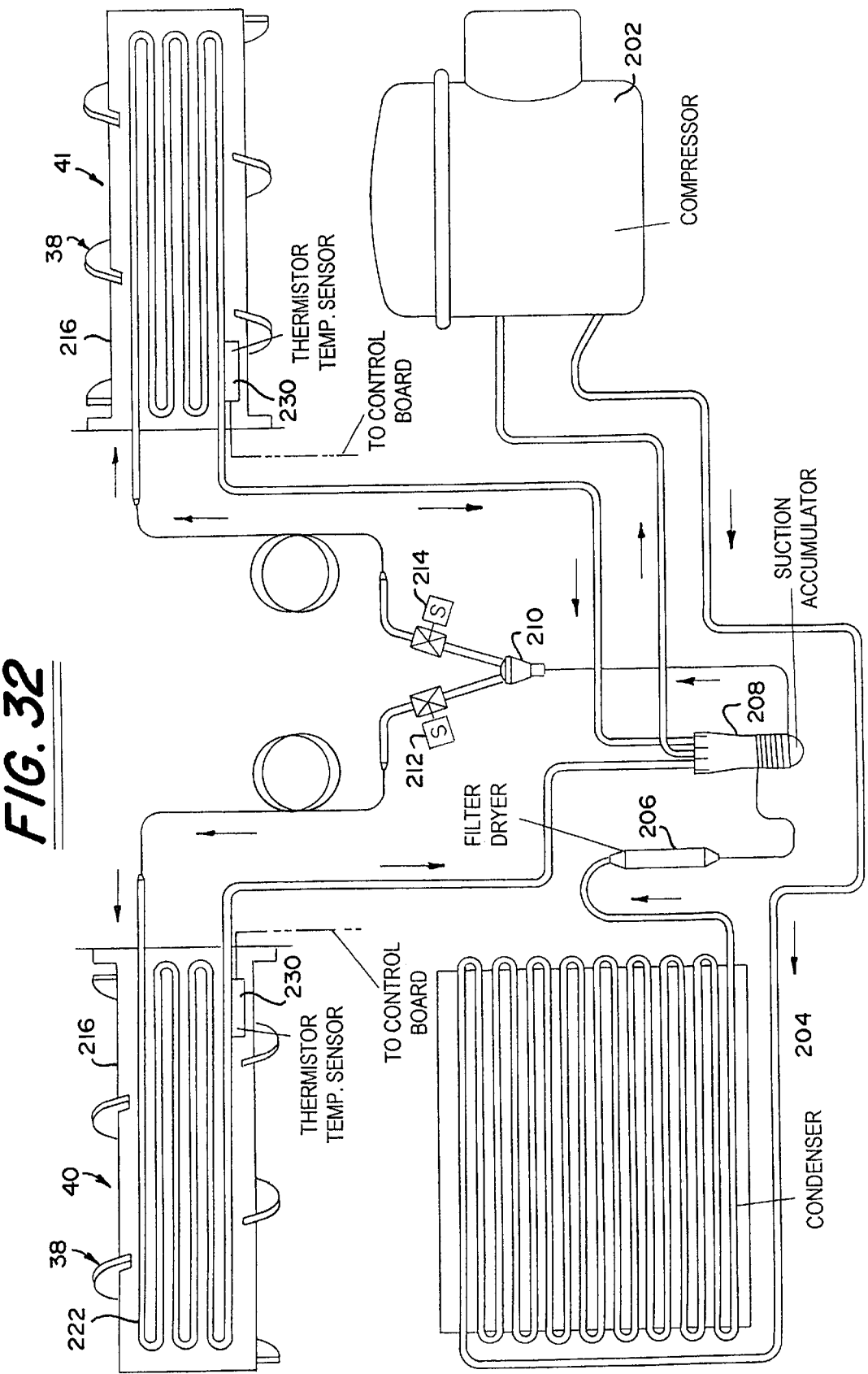
FIG. 32 is a diagrammatic illustration of the coolant system employed in the present invention.

Turning now to FIGS. 9–11 and 32, the coolant system 200 of the present invention is shown diagrammatically in FIG. 32 while specific structures of the coolant system 200 are shown in FIGS. 9–11. The coolant system 200 includes a compressor 202, a condenser 204, a filter dryer 206 and a suction accumulator 208. As shown in FIG. 32, the coolant system provides coolant distribution to a pair of chiller assemblies 40,41. Coolant is distributed to both or only one of the chiller assemblies 40,41. Selective control of coolant to the chiller assemblies 40,41 is achieved by using a splitter 210 and a pair of controllable solenoid valves 212,214.

With further reference to FIGS. 9–11, the chiller assembly 40 includes a cooling drum 216 having a wall 218 and defining a cavity 220 therein. The cooling drum 216 is formed of a thermally conductive material to help transfer heat from the mixture which surrounds the outside surface 46 of the drum to a refrigeration coil 222 retained in the cavity 220. The coil 222 is sized and dimensioned to snugly fit against the inside surface of the wall 218 to facilitate heat transfer from the beverage solution to the refrigeration or coolant medium flowing through the coil 222. As shown in FIG. 11, epoxy 224 is applied to the coil to fill the spaces between neighboring portions of the coil. The epoxy 224 is chosen for its thermally conductive characteristic so as to further increase the thermal conductivity between the drum 216, the coil 222 and the coolant medium flowing through the coil 222. Generally, the epoxy 224 is applied to the outside of the coil 222 and to the inside surface of the drum before inserting the coil into the cavity 220 of the drum 216. The epoxy 224 is applied to fill the small voids between the curved surfaces of the coil thereby facilitating increased heat transfer therethrough. With reference to FIG. 9, insulation material 226 is provided internally of the coil 222 to insulate the area between the coil 222 and the hollow bore 56 through which the shaft assembly 52 is positioned. As indicated in FIG. 32, the auger assembly 38 moves relative to the fixed drum 216 so as to spread and move beverage mixture along the outside surface 46 thereby transferring heat from the beverage mixture to the coolant flowing through coil 222. A thermistor temperature sensor 230 is provided internally of the chiller assembly 40 and is connected to a control circuit as indicated in FIG. 33.

Turning now to the electrical schematic as shown in FIG. 33, the present system includes generally redundant left and right assemblies. As such, reference to each assembly will be made by using identical reference numerals where possible. Further, reference numerals indicated hereinabove will generally be used to indicate the same elements illustrated diagrammatically in the schematic of FIG. 33.

Figure 28:
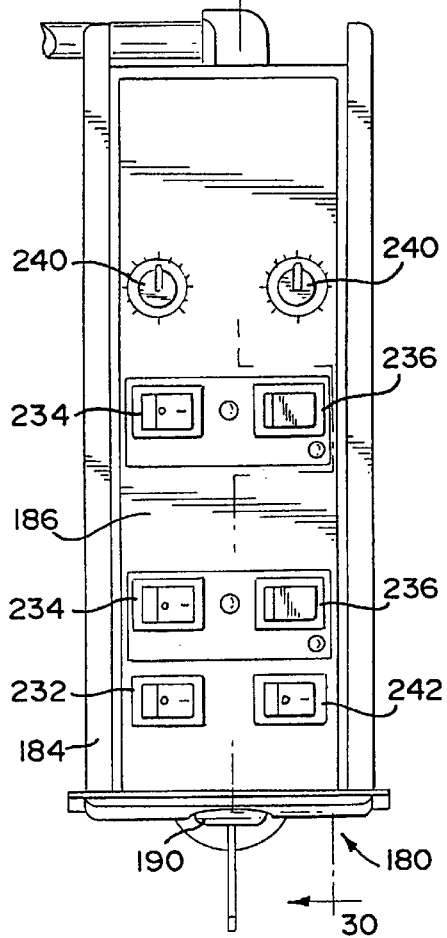
Figure 30:
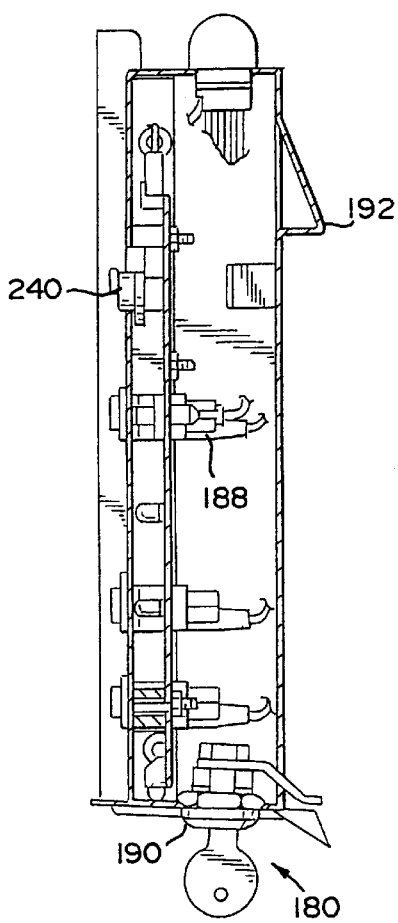
Figure 29:
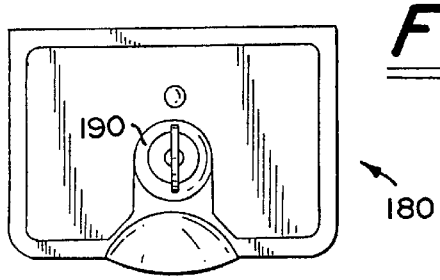

With reference to FIG. 33 and additional reference to FIG. 28, the system includes a main power switch 232 which controls power to the overall system. Additionally, each hopper and chiller assembly have a separate auger switch 234 which controls the power to the corresponding motor 236. Control of the chilling of beverage is achieved by use of the ice/no-ice switches 236 which are coupled to a control circuit or controller 238.

The action of solenoid valves 212,214 is controlled by controller 238. In the "ice" position of 236, the valves are controlled in response to the torque measurement from sensor 244. In the "no-ice" position, the valves are controlled in response to the temperature sensed by thermistor 230 as compared to a desired value (typically 37° F.) stored in the controller 238 memory.

Variable resistors 240 allow the user to set the torque which yields the desired slush stiffness when 236 is in the "ice" position.

The compressor is switched on or off by the controller 238 in a way which maximizes its life by reducing wear and tear. Competitive machines do not have feature 2 below.

1. When the controller 238 calls for more cooling and the compressor 202 is off, the controller 238 turns on valves 212,214 for a predetermined time (about 2 minutes) prior to turning on the compressor. This allows any trapped pressure in the cooling system to equalize. The compressor 202 can be damaged by starting when there is a large pressure difference from output to input.
2. When no further cooling is needed, the controller 238 turns off valves 212,214 and allows the compressor 202 to continue to run for approximately one minute. This allows for a momentary high torque indication from sensor 244 which prematurely indicated the slush has reached the desired consistency. This could be caused by a chunk of ice jammed in the auger or stuck to the drum. If cooling is called for within the one minute window, then only the valves need be turned on and the compressor 202 is not cycled off and back on. Note, an additional benefit of this technique is the compressor does not have to go through the 2 minute wait period (described above in 1) and cool down time is shortened.

Further, with regard to the temperature of the beverage, a night control 242 is provided to place the apparatus 30 in a "night" mode. The night control 242 overrides the pre-existing control pre-sets to maintain the beverage at a predetermined temperature point above freezing yet in a chilled condition. The night control effectively overrides the settings of the "ice/no-ice" switches and places both in the "no-ice" condition. The night control 242 allows the mixture to thaw from a slush state to a liquid state. This periodic thawing during off hours or "night" hours help maintain consistent flavor in the mixture. If the mixture were to be maintained in a frozen condition continuously without ever going back to a liquid solution, the flavor solids in the mixture would tend to migrate the outside of the crystals retained in the slush. In other words, each crystal tends to form with the flavor solids mixed throughout. As the mixture is maintained in a slush state over a long period of time, the solids tend to migrate from the center of the crystal to the outside. This decreases the desired characteristics of the flavor and reduces consistency in the beverage. As such, the night control helps maintain consistency and flavor quality throughout service hours.

Additionally, the night control 242 is set to maintain the mixture in a chilled state. The chilled state helps to reduce and minimize the start up time. In other words, for example, if the beverage mixture is maintained at 360 degrees during off hours and the desired slush temperature is 33°, the mixture only needs to be decreased by 40 in order to achieve the desired dispensing temperature. Whereas if the mixture is allowed to completely thaw and rise to room temperature, for example 70°, the temperature would need to be decreased 37° to achieve serving temperature. As such, it can be seen that the control of the present invention by use of the night control 242 and method facilitate more efficient operation of the beverage system.

A left and right torque sensor 244 are provided to sense the pins 80,88. As such, the compressor 202 can be controlled as a result of the torque sensor 244.

A lamp assembly 248 is provided in the cover assembly 44. The lamp illuminates display panels 250 attached to the cover 132. Each lamp assembly associated with each hopper assembly is coupled to the control circuit by way of a removable connector 252. The removable connector allows the cover assembly 44 to be completely removed from the hopper assembly and from the overall apparatus 30.

While a preferred embodiment of the present invention is shown and described, it is envisioned that those skilled in the art may devise various modifications and equivalents without departing from the spirit and scope of the claims. The invention is not intended to be limited by the foregoing disclosure.

We claim:

1. A cold drink system for chilling a liquid to form a partially frozen beverage, said cold drink system comprising:

at least one beverage hopper for retaining a quantity of liquid for chilling and dispensing therefrom;

a cooling assembly communicating with said hopper for cooling said liquid;

a compressor coupled to said cooling assembly for providing a cooling effect in said cooling assembly;

an auger and drive, said auger positioned in close proximity to said cooling assembly for removing chilled liquid therefrom and mixing said partially frozen beverage in said hopper, said drive motor moving said auger relative to said cooling assembly;

a drive shaft connecting said auger to said drive, said drive shaft including a torsion spring portion, a pair of protruding pins, one pin being attached to said shaft, a second pin being movably attached to said torsion spring;

a sensor assembly positioned proximate to said protruding pins for sensing angular deflection of said pins; and a controller, said sensor and said compressor coupled to said controller, said controller operating said compressor in response to angular deflection of said torsion spring as manifested in a change in the relative positions of said pins as sensed by said sensor.

2. A cold drink system according to claim 1 in which said controller deactivates said compressor when a first predetermined value of said angular deflection is sensed.

3. A cold drink system according to claim 2 in which said controller waits for a predetermined period before deactivating said compressor when said first predetermined value of angular deflection is sensed.

4. A cold drink system according to claim 1 in which said controller is adapted to activate said compressor when a second predetermined value of said angular deflection is sensed.

5. A cold drink system according to claim 4 in which said system is provided with valves for controlling a supply of cooling medium to said cooling assembly and said controller is adapted to open said valves for a predetermined time, to release any trapped pressure in said cooling assembly, prior to activating said compressor.

6. A cold drink system according to claim 1 further comprising a housing on which said beverage hopper is retained, said housing having a drawer formed therein and said system further including a control panel for setting operating parameters of said system, said control panel being retained in said drawer, to isolate said control panel from a dispensing area of said system.

7. A cold drink system according to claim 6 in which said control panel is provided with a plurality of control switches to facilitate setting of said operating parameters.

8. A cold drink system according to claim 6 in which said drawer is adapted to be moved outwardly of said housing to provide access to said control panel.

9. A cold drink system according to claim 8 in which said drawer is provided on a front portion of said housing to facilitate access to said control panel.

10. A cold drink system according to claim 8 in which said drawer is provided with a lock to prevent unauthorized access to said control panel.

11. A cold drink system according to claim 8 in which a stop is provided on a bottom portion of said drawer so that when the drawer is moved outwardly from said housing, said drawer is retained in engagement with said housing.

12. A cold drink system according to claim 1 in which said beverage hopper is provided with a hopper cover, said hopper cover including a concave recessed area which faces the inside of said hopper when said hopper cover is placed over said hopper.

13. A cold drink system according to claim 12 in which said hopper cover is slidably mounted on said hopper.

14. A system for sensing the viscosity of a slush mixture comprising:

a rotatable mixing member for mixing the slush mixture;

a drive device coupled to said rotatable mixing member for imparting rotation to said rotatable mixing member;

a drive shaft connecting the drive device and the rotatable mixing member, said drive shaft being adapted for rotation to effect rotation of said mixing member, said drive shaft including a resilient coupling, said resilient coupling being adapted for rotation relative to said drive shaft so that when said drive shaft is rotated the relative angular position of said drive shaft and said resilient coupling varies in relation to the viscosity of the slush mixture, said drive shaft includes a first pin, said resilient coupling includes a second pin, said first pin and second pins being angularly displaced from each other; and a sensor positioned adjacent the drive shaft for sensing the relative angular position of said drive shaft and said resilient coupling as it varies in relation to the viscosity of the slush mixture, said sensor senses the relative angular position of said drive shaft and said resilient coupling by sensing the angular displacement between said first and second pins.

15. A system for sensing the viscosity of a slush mixture comprising:

a rotatable mixing member for mixing the slush mixture, said mixing member is mounted on a mixing shaft;

a drive device coupled to said rotatable mixing member for imparting rotation to said rotatable mixing member;

a drive shaft connecting the drive device and the rotatable mixing member, said drive shaft being adapted for rotation to effect rotation of said mixing member, said drive shaft including a resilient coupling, said resilient coupling being adapted for rotation relative to said drive shaft so that when said drive shaft is rotated the relative angular position of said drive shaft and said resilient coupling varies in relation to the viscosity of the slush mixture, said resilient coupling includes a torsion spring portion and a torsion spring retainer, said torsion spring portion having a first end, a second end, and a central body portion, said first end of said torsion spring portion being retained on said drive shaft, said second end being retained on said mixing shaft, and said central body portion being retained in said torsion spring retainer; and a sensor positioned adjacent the drive shaft for sensing the relative angular position of said drive shaft and said resilient coupling as it varies in relation to the viscosity of the slush mixture.

16. A system according to claim 15 in which said torsion spring retainer comprises a substantially annular member having a central bore in which said drive shaft is received.

17. A system according to claim 16 in which said drive shaft includes a first pin for retaining said drive shaft within said central bore and said torsion spring retainer includes a slot portion through which said first pin extends.

18. A system according to claim 17 in which said torsion spring includes a second pin, which protrudes through a hole in said torsion spring retainer and is angularly displaced from said first pin.

19. A system according to claim 18 in which said sensor senses the angular displacement between said first and second pins to determine the relative angular position of said drive shaft and said resilient coupling.

* * * * *